US012632821B2

(12) United States Patent
Zinger

(10) Patent No.: US 12,632,821 B2
(45) Date of Patent: May 19, 2026

(54) SYSTEMS AND METHODS FOR LOCATION USING A PLURALITY OF DEVICES

(71) Applicant: Cognian Technologies Ltd., North Ryde (AU)

(72) Inventor: Vicheslav Zinger, Normanhurst (AU)

(73) Assignee: Cognian Technologies Ltd., North Ryde (AU)

( * ) Notice: Subject to any disclaimer, the term of this patent is extended or adjusted under 35 U.S.C. 154(b) by 143 days.

(21) Appl. No.: 17/770,498

(22) PCT Filed: Oct. 21, 2020

(86) PCT No.: PCT/IB2020/059888
§ 371 (c)(1),
(2) Date: Apr. 20, 2022

(87) PCT Pub. No.: WO2021/079281
PCT Pub. Date: Apr. 29, 2021

(65) Prior Publication Data
US 2022/0383247 A1      Dec. 1, 2022

Related U.S. Application Data

(60) Provisional application No. 62/924,465, filed on Oct. 22, 2019.

(51) Int. Cl.
*G06Q 10/087*      (2023.01)
*G01S 5/02*      (2010.01)
(Continued)

(52) U.S. Cl.
CPC .......... *G06Q 10/087* (2013.01); *G01S 5/0205* (2013.01); *H04W 4/029* (2018.02); *H04W 56/0025* (2013.01); *H04W 72/046* (2013.01)

(58) Field of Classification Search
CPC ....... G06Q 10/087; G01S 5/0205; G01S 3/28; G01S 5/021; H04W 4/029;
(Continued)

(56) References Cited

U.S. PATENT DOCUMENTS

| | | | |
|---|---|---|---|
| 10,365,347 B1 * | 7/2019 | Amir ...................... | H04W 4/02 |
| 2013/0140357 A1 * | 6/2013 | Ure ..................... | G06F 16/7867 235/375 |

(Continued)

FOREIGN PATENT DOCUMENTS

| | | | | |
|---|---|---|---|---|
| WO | WO 2017127743 | 7/2017 | | |
| WO | WO 2018/027264 | 2/2018 | | |
| WO | WO-2018027264 A1 * | 2/2018 | ............. | H04L 12/00 |

OTHER PUBLICATIONS

International Search Report dated Nov. 23, 2020 for PCT/IB2020/059888.

*Primary Examiner* — A. Hunter Wilder
(74) *Attorney, Agent, or Firm* — Jones Day

(57) ABSTRACT

The present disclosure is related to systems, methods, and processor readable media for distributing digital data for location, asset tracking and asset management purposes. Certain embodiments relate to systems, methods, and devices used within such applications where at least a substantial portion of the devices are capable of interacting with one or more neighbouring devices, and then by synchronous in time.

20 Claims, 11 Drawing Sheets

(51) Int. Cl.
   *H04W 4/029*      (2018.01)
   *H04W 56/00*      (2009.01)
   *H04W 72/044*     (2023.01)

(58) Field of Classification Search
   CPC . H04W 56/0025; H04W 72/046; H04W 4/80;
           H04W 64/00; H04W 4/023; H04W 8/005;
           H04W 48/16; H04W 4/025; H04W 88/08;
                                           H04W 4/02
   See application file for complete search history.

(56)                References Cited

U.S. PATENT DOCUMENTS

| | | |
|---|---|---|
| 2014/0111313 A1 | 4/2014 | Wild et al. |
| 2016/0284185 A1* | 9/2016 | Maison ................... H04B 5/70 |
| 2018/0121688 A1 | 5/2018 | Ianni et al. |
| 2019/0187236 A1* | 6/2019 | Ylamurto .............. G01S 13/878 |
| 2019/0191357 A1* | 6/2019 | Slav ..................... H04W 40/32 |
| 2023/0011851 A1* | 1/2023 | Bilstad ................. H04W 64/00 |

* cited by examiner

| Device | Neighbor 1 | RSSI | Neighbor 2 | RSSI |
|---|---|---|---|---|
| 1 | 5 | -40 | 6 | -70 |
| 2 | 9 | -37 | 8 | -75 |
| 3 | 8 | -55 | 6 | -80 |
| 4 | 7 | -45 | 6 | -80 |
| 5 | 1 | -20 | 6 | -40 |
| 6 | 5 | -40 | 3 | -70 |
| 7 | 4 | -25 | 9 | -75 |
| 8 | 3 | -35 | 2 | -55 |
| 9 | 2 | -17 | 7 | -75 |

| ID | Time | Chnl | Cycle | Period |
|----|------|------|-------|--------|
| 2  | 50   | 2    | 173   | 15     |
| 3  | 70   | 1    | 189   | 14     |

SYSTEMS AND METHODS FOR LOCATION USING A PLURALITY OF DEVICES

CROSS REFERENCE TO RELATED APPLICATION

This application is the National Phase application of International Application No. PCT/IB2020/059888, filed Oct. 21, 2020, which designates the United States and was published in English, which claims priority to U.S. Provisional Application No. 62/924,465, filed Oct. 22, 2019. These applications are herein incorporated by reference in its their entirety.

FIELD

The present disclosure relates generally to fields of location, micro-location, asset tracking and management, and/or beacons. Certain embodiments relate to systems, methods and/or devices used within such fields wherein at least a substantial portion of a plurality of devices are capable of interacting with one or more neighboring devices from the plurality of devices to provide a location and/or micro location of at least one of the devices from the plurality of devices.

BACKGROUND

If a prior art publication is referred to herein, this reference does not constitute an admission that the publication forms part of the common general knowledge in the art in Australia or in any other country.

Various approaches are utilized in a number of applications to provide a location and/or micro location of a device.

One approach is to utilize existing WiFi infrastructure and use WiFi tags to transmit a signal, which is received by one or more access points use signal strength to determine the location of the tag.

Another approach uses angle of arrival and time of arrival to provide location of the tag. This approach works in application where tags are predominantly within a line of sight of the access points and there are few obstructions between the tag and access point.

Another approach is for the WiFi tag is to receive signals from multiple access points and determine its own location based on signal strength and/or angle of arrival and time of arrival.

Those approaches are expensive because of the cost of WiFi chips and have a very short battery life due to high current consumption of the WiFi. They also typically require site surveys to compensate for multi-path reflections.

Another set of applications involves using BLE advertisement packets to determine device location. One approach is to use beacons that transmit BLE advertisement packet, which is received by smart device, like a smart phone. Smart phone then determines its own location based on signal strength.

This approach has significant battery life implications for beacons and also for smart phone. Typical battery life of a beacon is three-four month.

The beacon approach does not provide a true micro-location as micro location depends on density of the beacons.

Another approach is to locate tags that transmit BLE advertisement packets by nearby smart devices. This approach also has significant battery life implications and does not provide micro-location.

Another approach is to use BLE access points to provide location for tags transmitting BLE advertisement packets using received signal strength and/or angle of arrival and time of arrival.

The above approaches can't handle large amounts of tags and are typically limited to 20 tags per access point.

Many of these approaches don't address manageability of beacons and tags, such as battery level, ability to change parameters within a beacon or a tag and perform firmware upgrades.

Many of these approaches don't address security and authentication of tags and beacons. One example is an ability to introduce a rouge beacon.

Accordingly, systems, methods and/or devices for addressing these and other problems disclosed herein are desirable. The present disclosure is directed to overcome and/or ameliorate at least one of the disadvantages of the prior art as will become apparent from the discussion herein.

SUMMARY

The present disclosure is directed, at least in part, to overcoming and/or ameliorating one or more of the problems described herein. The embodiments provided in the summary are not meant to be limiting in that other embodiments are provided in other portions of this disclosure.

Certain embodiments are to a system comprising a plurality of devices wherein at least one device from a first portion of devices from the plurality of devices is capable of receiving data from and sending data to at least one other device from the first portion of devices from the plurality of devices; and at least one device from a second portion of devices from the plurality of devices is capable of receiving and sending data; wherein the distance between the at least one device from the second portion of devices from the plurality of devices and the at least one device from the first portion of devices from the plurality of devices allows communication between the at least one device from the second portion of devices from the plurality of devices and the at least one device from the first portion of devices from the plurality of devices; and wherein the at least one device from the second portion of devices from the plurality of devices and the at least one device from the first portion of devices from the plurality of devices are synchronous in time; and wherein the at least one device from the second portion of devices transmits data at prescribed times; and wherein the data transmitted from the at least one device from the second portion of devices is used to determine a physical location within a space.

Certain embodiments are to a system comprising a plurality of devices: (a) the plurality of devices further comprises a first portion of devices and a second portion of devices; (b) at least one device from the first portion of devices is capable of receiving data from and sending data to at least one other device from the first portion of devices; and (c) at least one device from the second portion of devices that is capable of receiving and sending data; wherein the at least one device from the second portion of devices and the at least one device from the first portion of devices are able to exchange data; wherein the at least one device from the second portion of devices and the at least one device from the first portion of devices are capable of being synchronous in time; wherein the at least one device from the second portion of devices transmits data at prescribed times; and wherein the data transmitted from the at least one device from the second portion of devices is used to determine a physical location within a space.

A method of determining device location, wherein a location of at least one device from a first plurality of devices is known; and wherein the at least one device from the first plurality of devices and at least one first device from a second plurality of devices and at least one second device from the second plurality of devices are synchronous in time; and wherein the at least one second device from the second plurality of devices sends a first packet containing a payload and the at least one first device from the second plurality of devices receives the first packet containing the payload; and wherein the at least one first device from the second plurality of devices sends a second packet containing at least a portion of the payload contained in the first packet and the RSSI of the first packet; and wherein the payload of the second packet is used to determine the location of the at least one first device from the second plurality of devices and/or the at least one second device from the second plurality of devices.

A method of determining device location comprising: (a) configuring a system comprising a plurality of devices, wherein the plurality of devices further comprises a first portion of devices and a second portion of devices; wherein the at least one device from the first plurality of devices and at least one first device from the second plurality of devices and at least one second device from the second plurality of devices are synchronous in time; and (b) determining a location of at least one device from the first plurality of devices by sending a first packet containing a payload from the at least one second device from the second plurality of devices and the at least one first device from the second plurality of devices receives the first packet containing the payload; wherein the signal strength of the second packet is used to determine the location of one or more of the following: the at least one first device from the second plurality of devices and the at least one second device from the second plurality of devices.

Certain embodiments are to a system comprising:
a plurality of devices wherein at least one device from a first portion of devices from the plurality of devices is capable of sending data;
at least one second device from the plurality of devices is able to receive the data sent by the at least one first device; and
at least one third device from the plurality of devices is capable of sending data and the at least one second device from the plurality of devices is capable of receiving the data sent by the at least one third device from the plurality of devices;
wherein the at least one first device from the plurality of devices, the at least one second device from the plurality of devices, and the at least one third device from the plurality of devices are synchronous in time; and
wherein the probability of collision between the at least one first device from the plurality of devices and the at least one third device from the plurality of devices is less than 0.0001%, 0.001%, 0.01%, 0.1%, or 1%.

BRIEF DESCRIPTION OF FIGURES

These and other features, aspects, and advantages of the present disclosure will be better understood with regard to the following description, appended claims, and accompanying figures where:

DETAILED DESCRIPTION

Figure 1:
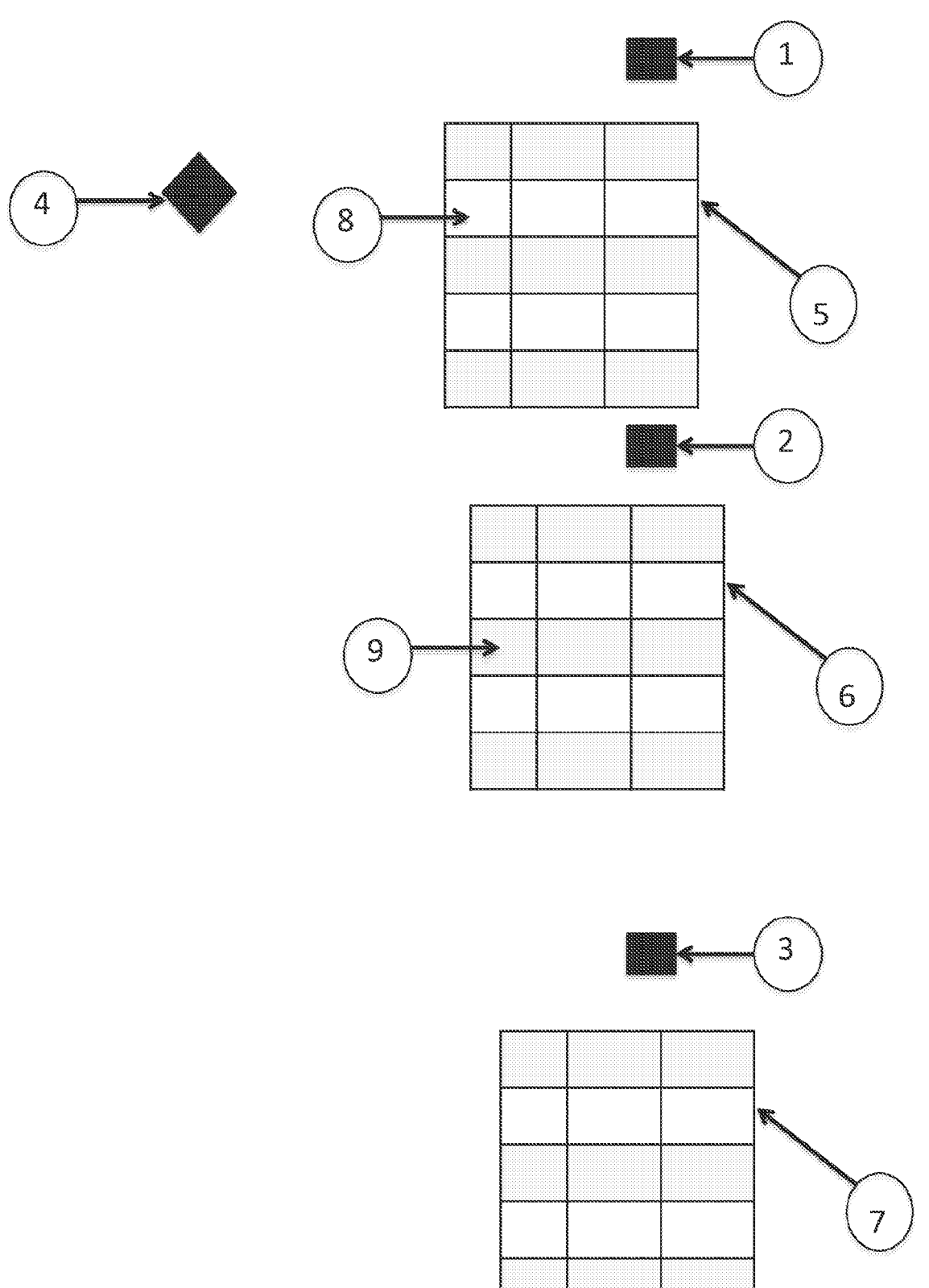
FIG. 1 illustrates an exemplary embodiment of a system comprised of access points and a tag and timing of synchronization packet.

The present disclosure is described in further detail with reference to one or more embodiments, some examples of which are illustrated in the accompanying drawings. The examples and embodiments are provided by way of explanation and are not to be taken as limiting to the scope of the disclosure. Furthermore, features illustrated or described as part of one embodiment may be used by themselves to provide other embodiments and features illustrated or described as part of one embodiment may be used with one or more other embodiments to provide further embodiments. The present disclosure covers these variations and embodiments as well as other variations and/or modifications.

The subject headings used in the detailed description are included for the ease of reference of the reader and should not be used to limit the subject matter found throughout the disclosure or the claims. The subject headings should not be used in construing the scope of the claims or the claim limitations.

The terms "about" as used in this disclosure is to be understood to be interchangeable with the term approximate or approximately.

The term "comprise" and its derivatives (e.g., comprises, comprising) as used in this specification is to be taken to be inclusive of features to which it refers, and is not meant to exclude the presence of additional features unless otherwise stated or implied.

Certain embodiments disclosed herein may be tags, beacons, access points, gateways and systems that have wired devices and nodes. Certain embodiments disclosed herein may be tags, beacons, access points, gateways and systems that have both wireless devices and nodes. Certain embodiments disclosed herein may be tags, beacons, access points, gateways and systems that have both wired devices and nodes as well as wireless devices and nodes. The systems may comprise devices wherein a substantial portion of the devices are wireless. The systems may comprise devices wherein a substantial portion of the devices are wired. The systems may comprise devices wherein a first portion of the devices are wireless and a second portion of the devices are wired.

As used herein, a substantial portion of a plurality of devices at least means 40% of the plurality of devices, at least 50% of the plurality of devices, at least 70% of the plurality of devices, at least 80% of the plurality of devices, at least 90% of the plurality of devices, at least 95% of the plurality of devices, at least 99% of the plurality of devices, or 100% of the plurality of devices.

As used herein, a substantial portion of a plurality of devices means between 40% to 60% of the plurality of devices, between 50% to 70% of the plurality of devices, between 60% to 80% of the plurality of devices, between 70% to 90% of the plurality of devices, between 80% to 100% of the plurality of devices, or between 90% to 100% of the plurality of devices.

As used herein, the term "internal interference" means that at least one device of the plurality of devices fails to receive data from at least one other device of the plurality of devices because the at least one other device of the plurality of devices is transmitting data.

As used herein, the term "substantially internal interference free system" means a plurality of devices comprising a system, wherein probability of interference from at least one device from the plurality of devices comprising the system is 0%, between 0% to 0.00001%, between 0.00001%, to 0.0001%, between 0.0001%, to 0.001%, or between 0.001%, to 0.01%.

As used herein, the term "a located device" means a device capable of wirelessly sending or receiving data, wherein a physical location of the device relative to an object is known, or has been determined, within at least 0.1 m, 0.3 m, 0.5 m, 1 m, 2 m, 3 m, 5 m, or 10 m.

As used herein, the term "locating a device within a time" means determining a new physical location of the device after the device has been moved.

As used herein, the term "location build up time" means a time at which a number of located devices is at least 70%, 80%, 90%, 95%, or 99% of a plurality of devices that may comprise the system.

Time Synchronization.

As used herein, the terms "synchronize," "synchronize in time," and/or "time synchronization" means: at least two devices have the same, or substantially the same, understanding of time relative to each other. For example, if device A understands that it is 3 pm, then device B may also understand that it is 3 pm at the same, or substantially the same, time.

As used herein, the term "action" means one or more of the following: interrupt, MPU instruction, turning receiver on, turning receiver off, turning transmitter on, turning transmitter on, turning oscillator on, turning oscillator off and another action.

As used herein, the term "neighbors of a device from a plurality of devices" means one or more devices (neighbors) that are within a distance of the device from a plurality of devices that allows communication between the device from the plurality of devices and the one or more devices.

In certain embodiments, substantially the same time may mean that time difference between at least two actions is no greater than 1 part per million (ppm), 5 ppm, 10 ppm, 20 ppm, 30 ppm, 50 ppm, or 100 ppm.

In certain embodiments, substantially the same time may mean that time difference between at least two actions is between 1 to 5 ppm, 5 to 10 ppm, 10 to 20 ppm, 10 to 30 ppm, 20 to 50 ppm, or 40 to 100 ppm.

In certain embodiments, substantially the same time may mean that time difference between at least two actions is no greater than 1 microsecond, 5 microseconds, 10 microseconds, 50 microseconds, 100 microseconds, 200 microseconds, 500 microseconds, 1 millisecond, 2 milliseconds, 5 milliseconds, or 10 milliseconds.

In certain embodiments, substantially the same time may mean that time difference between at least two actions is between 1 to 5 microseconds, 5 to 10 microseconds, 10 to 50 microseconds, 50 to 100 microseconds, 50 to 200 microseconds, 100 to 500 microseconds, 500 microseconds to 1 millisecond, 1 to 2 milliseconds, 2 to 5 milliseconds, or 5 to 10 milliseconds.

Certain embodiments disclosed herein may be directed to a plurality of devices comprising a system where a first portion of the devices are wired and a second portion of the devices are wireless, wherein a substantial portion of the plurality of devices are synchronized in time. In certain embodiments, a substantial portion of the first portion of the wired devices are synchronized in time. In certain embodiments, a substantial portion of the second portion of the wireless devices are synchronized in time. In certain embodiments, a substantial portion of the first portion of the wired devices and a substantial portion of the second portion of the wireless devices are both synchronized in time.

In certain embodiments, time synchronization may be achieved by device listening on one or more RF channel(s) and adjusting its clock based on one or more of the following: start of a frame, start of a synchronization sequence, reception of predefined number of symbols of the synchronization sequence, start of data, end of the frame, end of the synchronization frame, and receiving predefined number of data symbols.

As used herein, the term "adjacent networks" means a plurality of devices comprising a first network and at least one second plurality of devices comprising at least one second network, wherein at least one device from the first network is capable of sending data and at least one device from the at least one second network is capable of receiving data.

In certain embodiments, a substantial portion of a plurality of devices comprising adjacent networks may be synchronized in time. Network synchronization protocols, such as NTP, may be applied to achieve synchronization.

FIG. 1 illustrates an exemplary embodiment of a system comprised of access points 1, 2 and 3, and a tag 4. The access points 1, 2, and 3 are synchronized in time. A time slot map 5 is associated with the access point 1, a time slot map 6 is associated with the access point 2, and a time slot map 7 is associated with the access point 3. The access point 1 transmits synchronization packet at time slot 8 and the access point 2 transmits synchronization packet at time slot 9, thus avoiding jamming. In certain embodiments, synchronization packets may be transmitted at substantially the same time and on different RF channels. In the exemplary embodiment the tag 4 is synchronized to the access point 1, access point 2 and access point 3 by receiving at least one synchronization packet on time slot 8 or time slot 9.

In certain embodiments, synchronization packets may be transmitted on at least one BLE channel.

In certain embodiments, synchronization packets may be repeated on at least two BLE channel.

In certain embodiments, a substantial portion of access points installed in one location may be substantially synchronous in time.

Certain embodiments are directed to a plurality of access points, where at least one access point from the plurality of access points is capable of receiving information from at least one other one access point from the plurality of access points, wherein a substantial portion of the plurality of access points may be synchronous in time.

Certain embodiments are directed to a plurality of access points and at least one device, where at least one access point from the plurality of access points is capable of receiving information from the at least one device and at least one other access point from the plurality of access points is capable of receiving information from the at least one device, wherein a substantial portion of the plurality of access points may be synchronous in time.

In certain embodiments, a portion of access points from a plurality of access points may share at least one time slot map associated with an access point from the plurality of access points.

In certain embodiments, a substantial portion of access points from a plurality of access points may share at least one time slot map associated with an access point from the plurality of access points.

In certain embodiments, synchronization packet may contain time slot of synchronization packets of neighboring access points.

In certain embodiments, synchronization packet may contain a hash value of the time slot table associated with an access point.

In certain embodiments, a hash value of a time slot table associated with an access point may be obtained by at least one of the following methods: SHA-128, SHA-256, SHA-512, signing the time slot table associated with the access point using block cypher, signing the time slot table associated with the access point using elliptic curve cryptography and signing the time slot table associated with the access point using RSA.

In certain embodiments, a hash value of a time slot table associated with an access point may be used by a device receiving a synchronization packet to determine whether the device needs to listen for information packet.

In certain embodiments, RF channel may be one of more of the following: narrow band RF channel, wideband RF channel and ultra-wide band RF channel. Other suitable RF channels may also be used.

In certain embodiments, at least one device from a plurality of devices comprising a system may initiate data transmission based on one or more of the following: internal clock, crystal-based clock, RC oscillator and external oscillator.

In certain embodiments, a device that received at least one synchronization packet and received at least one other synchronization packet may learn rate and direction of crystal drift for given temperature and may compensate for crystal drift. In other embodiments the device may record one or more of the following: direction of the drift, rate of the drift and temperature.

In certain embodiments, a synchronization packet may be part of BLE advertisement packet.

Synchronization Packet

In certain embodiments, the synchronization packet is used to achieve synchronization of the tags and enable tags to communicate with access points.

In certain embodiments, tags and/or access points may not form a wireless network.

In certain embodiments, a central computer may not be required to synchronize tags and/or access points in time.

In certain embodiments a first device from a plurality of devices may send a first synchronization packet and a second device from a plurality of devices may send a second synchronization packet and the first synchronization packet and the second synchronization packet may not be synchronized in time.

Figure 2:
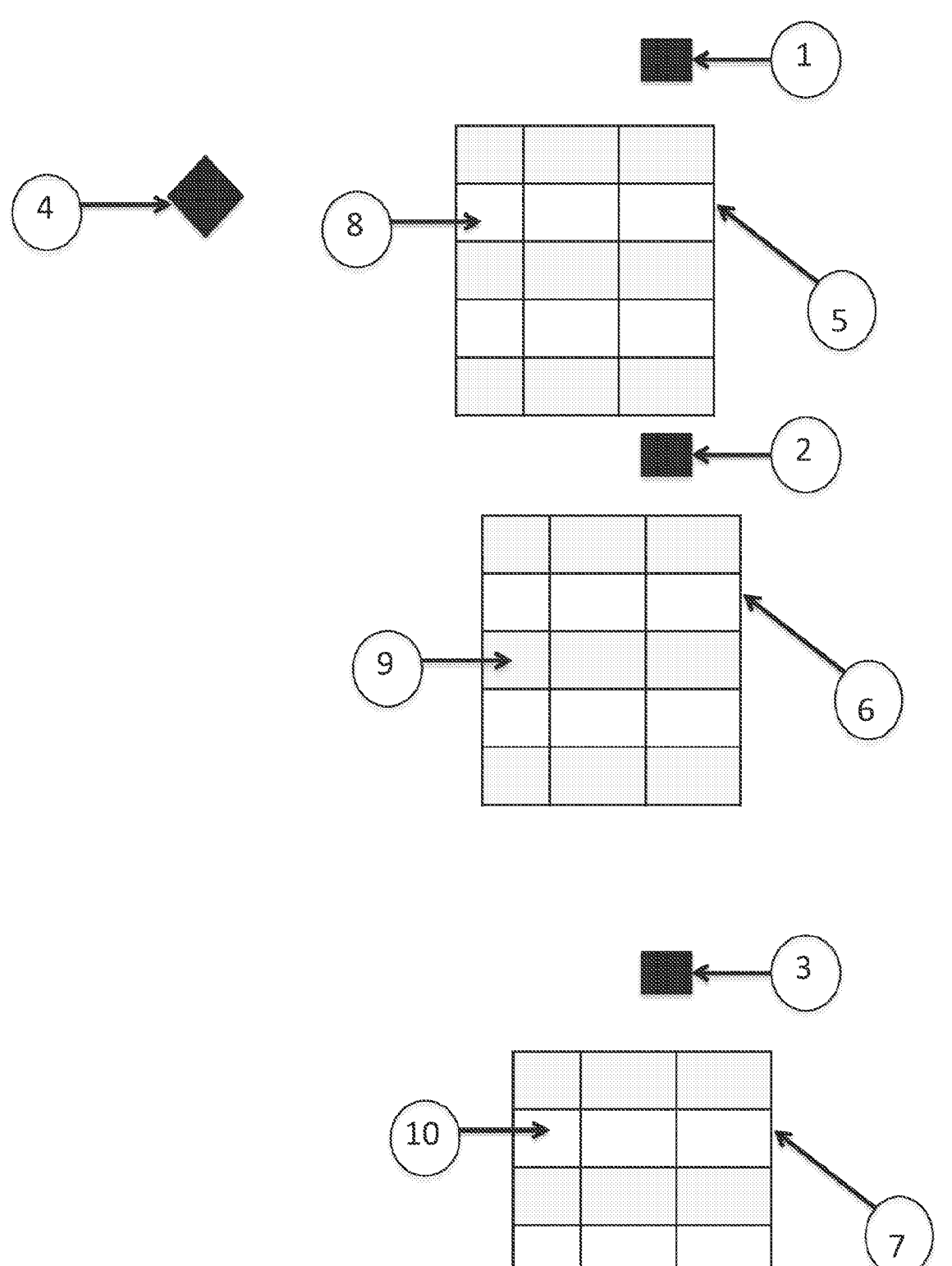
FIG. 2 illustrates an exemplary embodiment of a system comprised of access points and a tag and fee timeslots.

FIG. 2 illustrates an exemplary embodiment of a system comprised of access points 1, 2 and 3, and a tag 4. The access points 1, 2 and 3 are synchronized in time. A time slot map 5 is associated with the access point 1, a time slot map 6 is associated with the access point 2 and a time slot map 7 is associated with the access point 3. access points 1 and 2 are capable of receiving a signal from tag 4 and the access point 3 is not capable of receiving a signal from tag 4. 8 is a free time slot included in synchronization packet transmitted by the access point 1, 9 is a free time slot included in synchronization packet transmitted by the access point 2 and 10 is a free time slot included in synchronization packet transmitted by the access point 3. 8 and 10 are transmitted substantially at the same and on the same RF channel.

Figure 3:
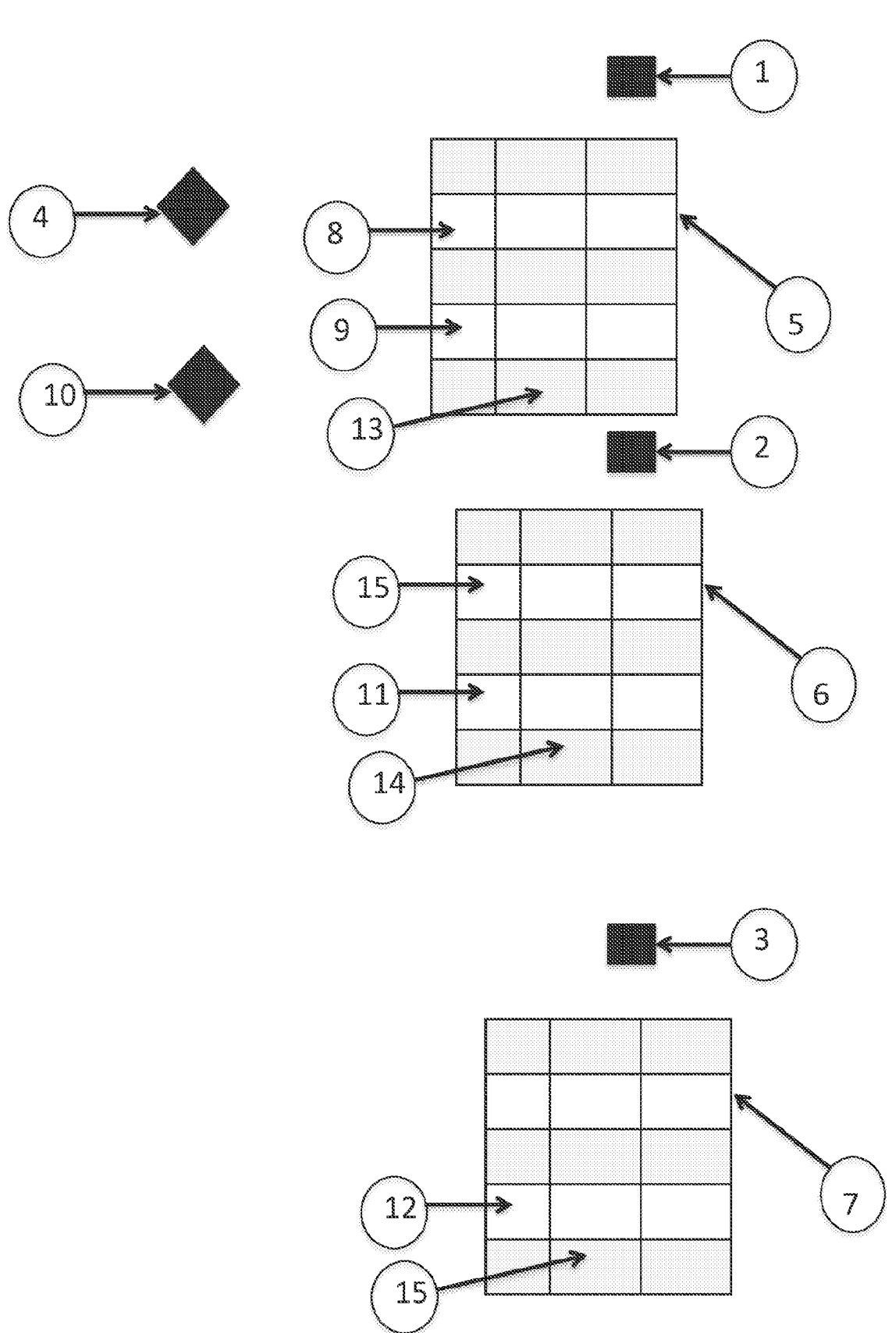
FIG. 3 illustrates an exemplary embodiment of a system comprised of access points and tags and time slot conflict resolution.

FIG. 3 illustrates an exemplary embodiment of a system comprised of access points 1, 2 and 3 and tags 4 and 10. The access points 1, 2, and 3 are synchronized in time. A time slot map 5 is associated with the access point 1, a time slot map 6 is associated with the access point 2, and a time slot map 7 is associated with the access point 3. access points 1 and 2 are capable of receiving a signal from tags 4 and 10, and the access point 3 is not capable of receiving a signal from tags 4 and 10. Time slots 8, 9 and 13 was advertised by access point 1 as free timeslot. The time slot 9 was then selected by tags 4 and 10. access point 1 detected a collision on time slot 9 and marks time slot 9 as forbidden time slot. Tag 4 selects time slot 8 and tag 10 selects time slot 13. The access point 1 shares it's time slot map with access points 2 and 3. The access point 2 marks slot 11 as forbidden times slot and time slots 15 and 14 as taken and will not advertise time slots 14 and 15 as free in the access point 2 information packet.

In certain embodiments, the synchronization packet may contain one or more of the following: free time slots, forbidden time slots, free time slots with signal strength threshold, relay time slots, and relay devices.

In certain embodiments, free time slot may contain transmission period.

In certain embodiments, transmission periods are selected to minimize the probability of collisions if at least two devices selected the same time slot.

In certain embodiments, at least one first device from a plurality of devices is capable of sending data; and at least one second device from the plurality of devices is capable of receiving the data sent by the at least one first device; and at least one third device from the plurality of devices is capable of sending data and the at least one second device from the plurality of devices is capable of receiving the data sent by the at least one third device from the plurality of devices; and wherein the at least one first device from the plurality of devices and the at least one second device from the plurality of devices and the at least one third device from the plurality of devices are synchronous in time; and wherein the probability of collision between the at least one first device from the plurality of devices and the at least one third device from the plurality of devices is less than 0.0001%, 0.001%, 0.01%, 0.1%, or 1%.

In certain embodiments, the synchronization packet and information packet may be combined to form one packet.

In certain embodiments, access point may transmit second Information Packet containing IDs of new tags.

Tag Synchronization

Figure 4:
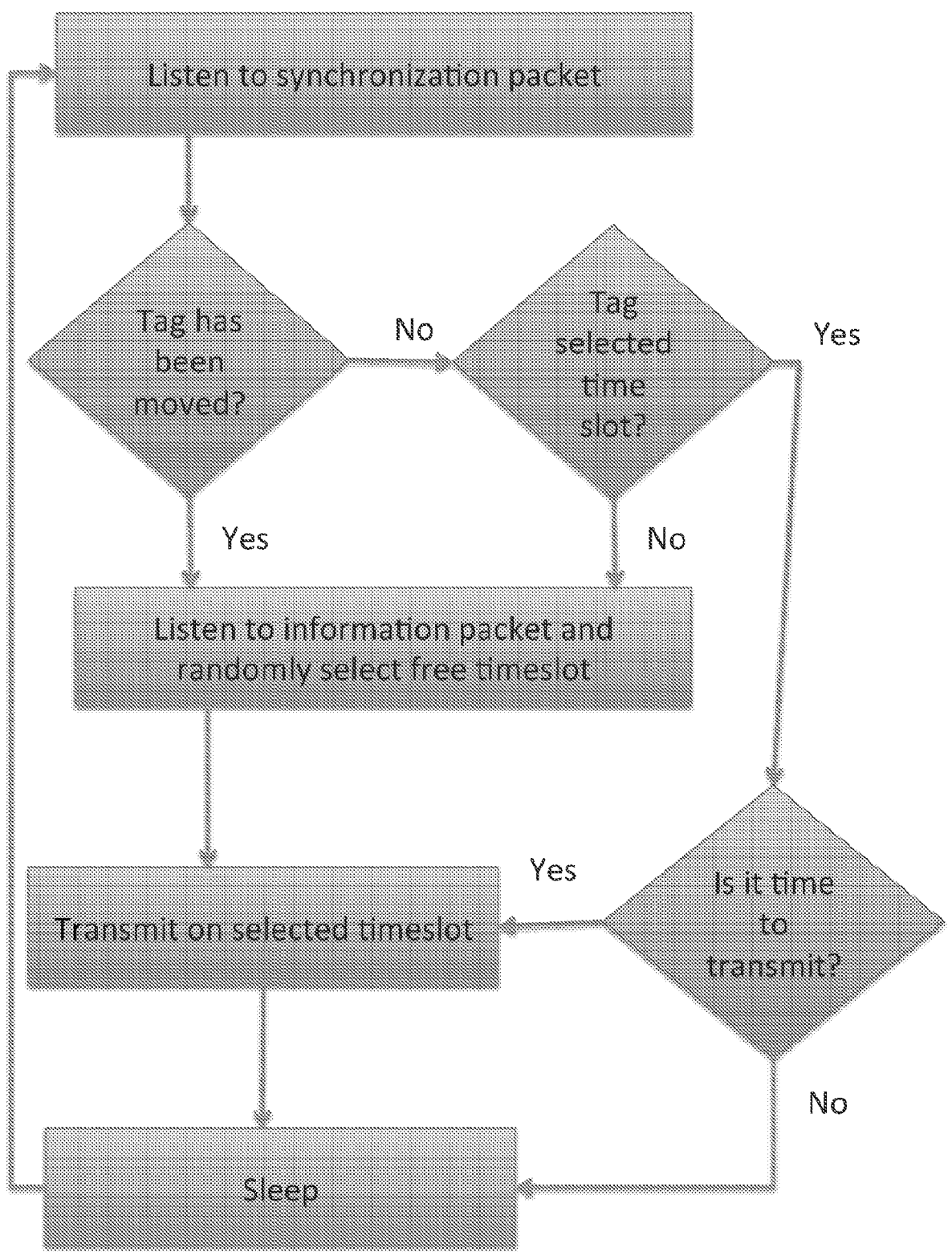
FIG. 4 depicts an exemplary algorithm of tag synchronization.

FIG. 4 depicts an exemplary algorithm of tag synchronization.

In certain embodiments, a tag may listen to multiple information packets from multiple access points.

In certain embodiments, a tag may receive a second Information Packet to determine whether an access point has received the tag's transmission.

In certain embodiments, a tag may repeat the transmission if the tag's ID is not found in second synchronization packet.

In certain embodiments, synchronization packet and a second Information Packet may be combined into one packet.

In certain embodiments, device may determine whether it was moved by using an accelerometer.

Figure 5:
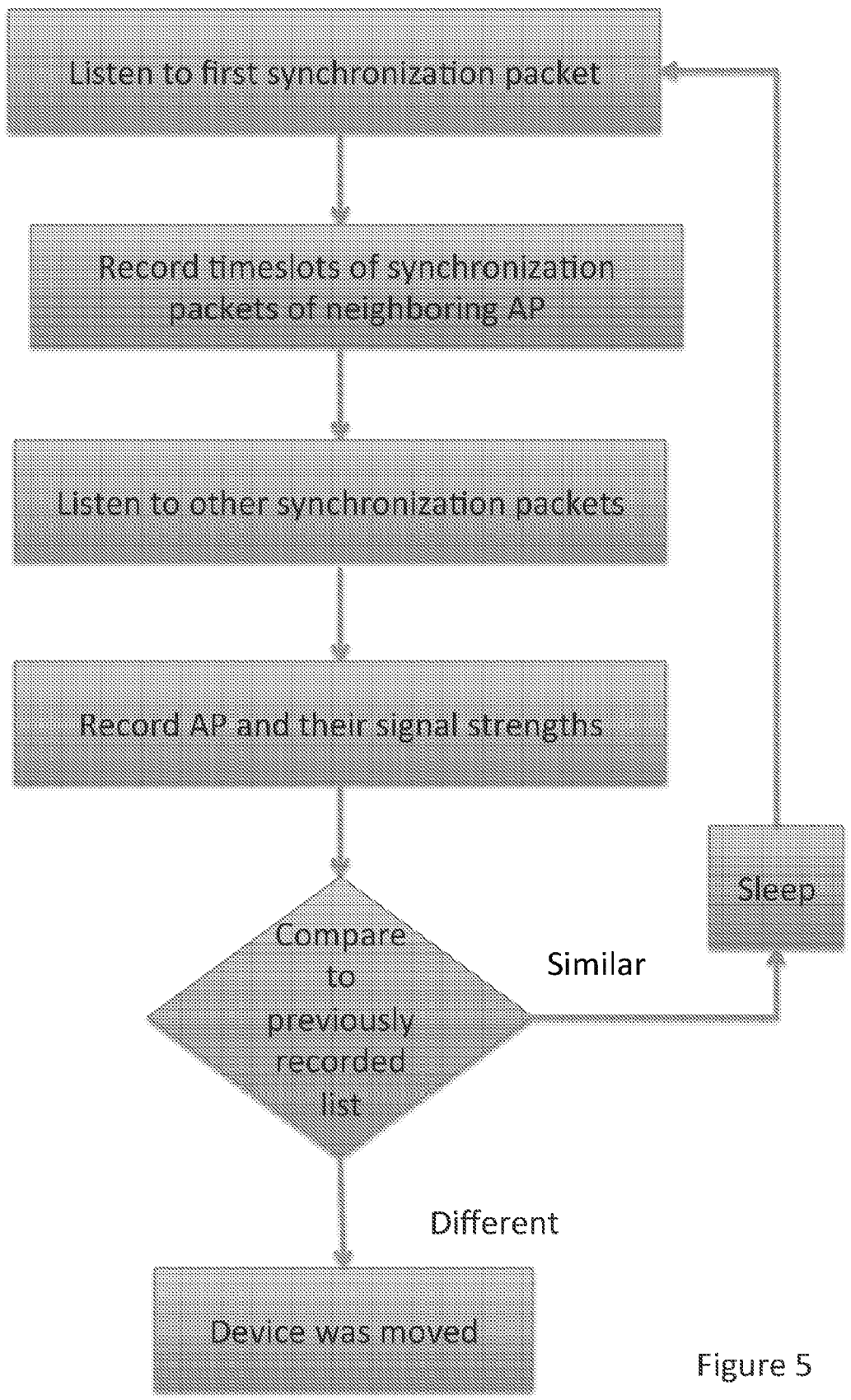
FIG. 5 illustrates an exemplary method of determining whether a device has been moved and/or whether the device needs to reselect a time slot based on access point information.

FIG. 5 illustrates an exemplary method of determining whether a device has been moved and/or whether the device needs to reselect a time slot based on access point information.

Figure 7:
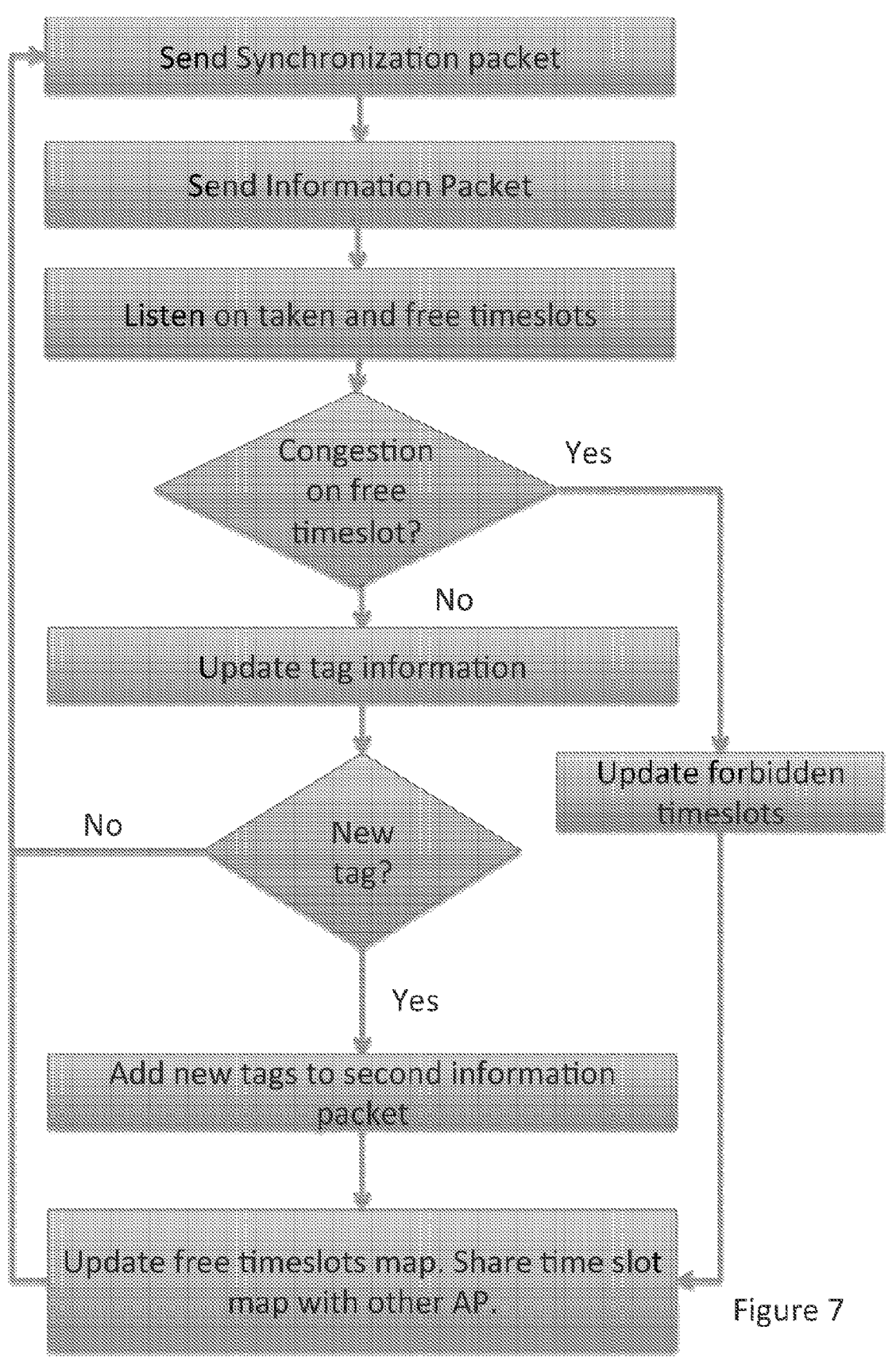
FIG. 7 depicts an exemplary algorithm of updating free and/or forbidden timeslots.

FIG. 7 depicts an exemplary algorithm of updating free and forbidden timeslots.

In certain embodiments, an exemplary algorithm depicted in FIG. 7 may be executed by substantial portion of access points.

In certain embodiments, an exemplary algorithm depicted in FIG. 7 may be executed by portion of devices from a plurality of devices.

Figure 8:
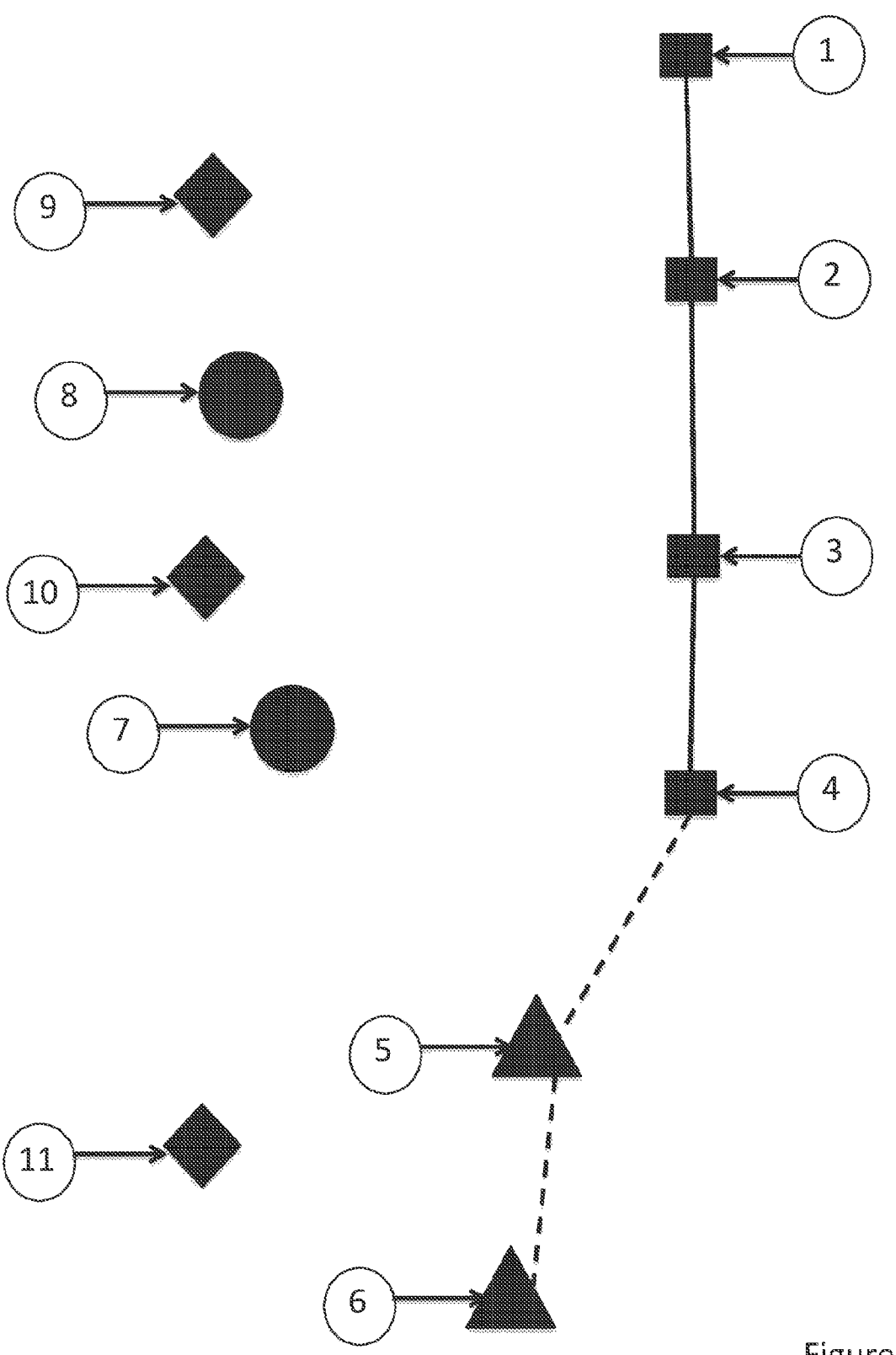
FIG. 8 illustrates an exemplary embodiment of wired and wireless access points, devices transmitting synchronization and/or information packets and tags.

FIG. 8 illustrates an exemplary embodiment of wired and wireless access points, devices transmitting synchronization and information packets and tags. In this figure access points 1, 2, 3, and 4 are wired; access points 5 and 6 are wireless; devices 7 and 8 transmit synchronization, and information packets and 9, 100 and 11 are tags.

In certain embodiments, at least one device of a plurality of devices may use energy harvesting for sending and receiving data.

In certain embodiments, at least one device of a plurality of devices may use energy from RF signal for sending and receiving data.

In certain embodiments, a substantial portion of a plurality of devices may use energy harvesting for sending and receiving data.

In certain embodiments, a substantial portion of a plurality of devices may use energy from RF signal for sending and receiving data.

Micro-Location

Figure 9:
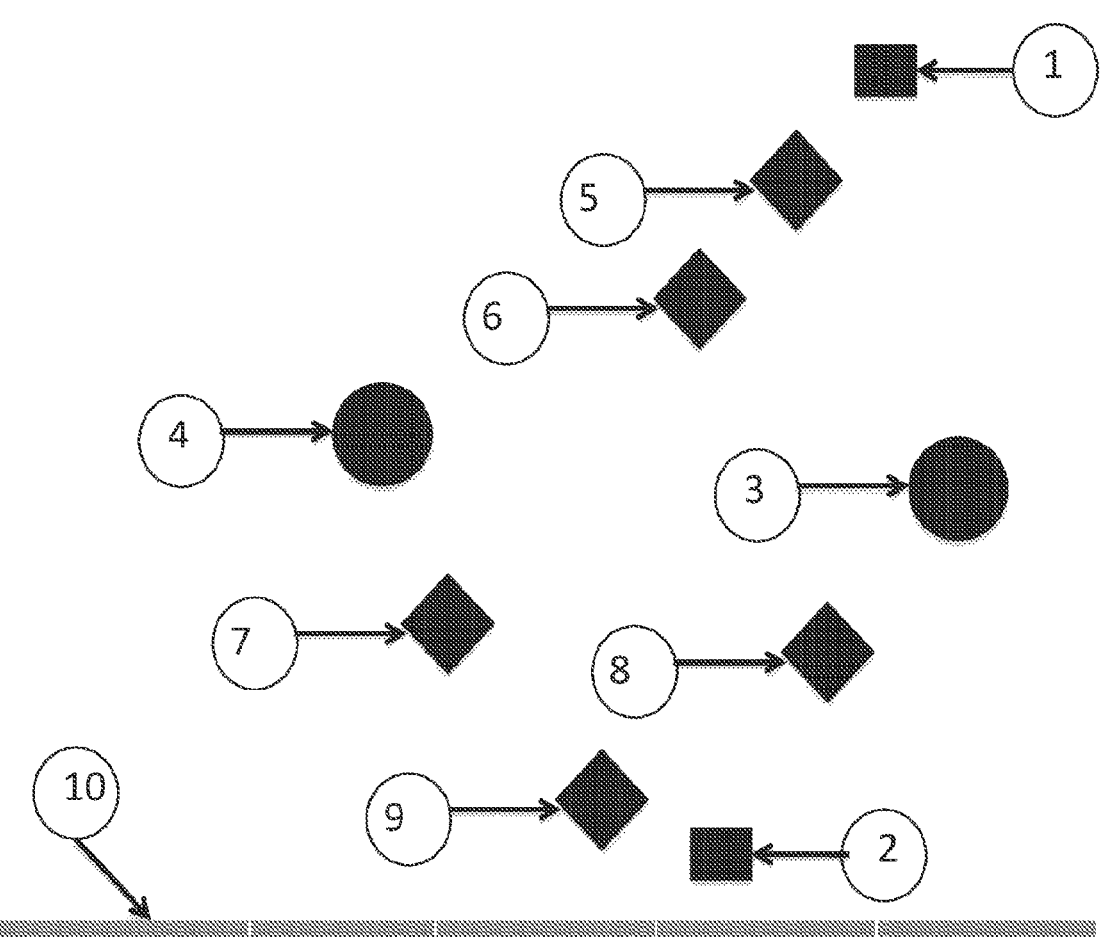
FIG. 9 illustrates an exemplary embodiment of finding micro location of tags.

FIG. 9 illustrates an exemplary embodiment of finding micro location of tags 5 to 9. In this exemplary embodiment, access points 1 and 2 are fixed and devices 3 and 4 are fixed. Table 10 in FIG. 9 shows two neighbors of the devices with strongest RSSI and their respective RSSI. Micro-location of devices 5 to 9 may be found by knowing the location of 1 to 4, and signal strength between neighbor devices.

In certain embodiments, a device from a plurality of devices may transmit at least one location packet.

In certain embodiments, at least one location packet may be transmitted at at least one prescribed period.

In certain embodiments, a device from a plurality of devices may receive location packets transmitted by at least one other device from the plurality of devices. The device from the plurality of devices may record ID and RSSI of the at least one other device from the plurality of devices.

In certain embodiments, a device from a plurality of devices may include recorded ID and RSSI of neighboring devices in a location packet.

In certain embodiments, a device from a plurality of devices may include in a location packet recorded ID and RSSI of X neighboring devices with highest RSSI values, wherein X is one of the following: 2, 3, 5, and 10.

In an exemplary embodiment, illustrated in FIG. 9 finding micro location of tags 5 to 9 may be achieved by measuring angle of arrival of the packet from tags 5 to 9.

In certain embodiments, a micro-location of a tag may be calculated and may be less than 1 meter from the actual location of the tag.

In certain embodiments, a micro-location of a tag may be calculated and may be less than 2 meters from the actual location of the tag.

In certain embodiments, a micro-location of a tag may be calculated and may be less than 0.5 meter from the actual location of the tag.

In certain embodiments, a tag may transmit a location packet and at least two devices from a plurality of devices receive the location packet and the at least two devices receive the location packet with RSSI higher or equal to the rest of the devices from the plurality of devices; and calculated micro-location of a tag is $(Xt, Yt)$—where $Xt$ is a calculated longitude of the tag and $Yt$ is a calculated latitude of the tag; and the actual location of the tag is $(Xr, Yr)$—where $Xr$ is an actual longitude of the tag and $Yr$ is an actual latitude of the tag; and the distance $Dt=SQRT((Xt-Xr)^2-(Yt-Yr)^2)$—where SQRT is a square root function and $^$ is mathematical function of power; and the distance between the first device of the at least two devices from the plurality of devices and the second device of the at least two devices from the plurality of devices is Da than $Dt=b*Da$, where b is between 0.5 and 1.0, between 0.5 and 0.8, between 0.8 and 1.2, or between 1.0 and 2.5.

In certain embodiments, the location packet may be iBeacon packet.

In certain embodiments, the location packet may be Edistone packet.

In certain embodiments, the location packet may be altBeacon packet.

In certain embodiments a tag may transmit location packet every 1 second, every 2 seconds, every 5 seconds, every 10 seconds or every 20 seconds.

In certain embodiments a tag may transmit location packet every 1 second to 2 seconds, every 2 seconds to 5 seconds, every 5 seconds to 10 seconds, every 10 seconds to 20 seconds or every 20 seconds to 60 seconds.

In certain embodiments a tag may start transmitting location packets if it received a predefined packet from a device from a plurality of devices.

In certain embodiments a tag may stop transmitting location packets if it received a predefined packet from a device from a plurality of devices.

In certain embodiments a tag may stop transmitting location packets if it did not receive a predefined packet from a device from a plurality of devices in last 30 seconds, 1 minute, 2 minutes or 5 minutes.

In certain embodiments, at least one device from a plurality of devices may transmit a location packet.

In certain embodiments, at least one device from a plurality of devices may transmit a first location packet and receive a second location packet.

In certain embodiments, the content of a first location packet may change and may depend on context of a second received location packet.

Smart Phone Synchronization

Figure 10:
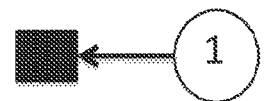
FIG. 10 illustrates an exemplary embodiment of synchronizing a smart phone to a synchronous beacon system.
Figure 10:
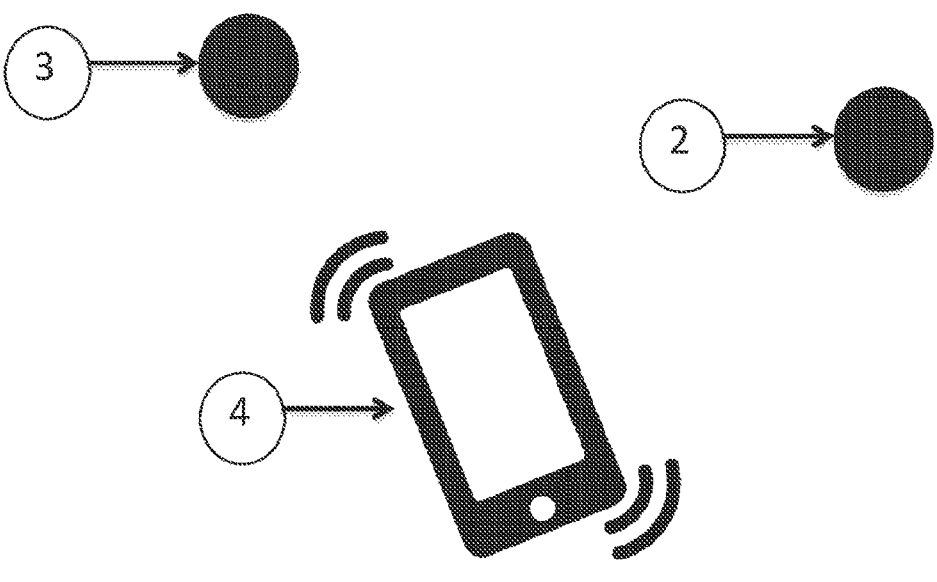
Figure 10:
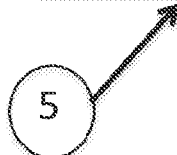

FIG. 10 illustrates an exemplary embodiment of synchronizing a smart phone to a synchronous beacon system. In this exemplary embodiment, the smart phone 4 receives a synchronization packet from the access point 1. The smart phone 4 then obtains information in table 5 and turns the BLE receiver on at the cycle, time slot and channel derived from table 5. The smart phone 4 receives BLE advertisement packet from beacons 2 and 3.

Security

In certain embodiments, a substantial portion of a plurality of devices may be preconfigured with encryption and/or decryption key.

In certain embodiments, encryption and/or decryption keys may be loaded into a portion of a plurality of devices comprising a network using Public Key cryptography.

In certain embodiments, encryption and/or decryption keys may be loaded into a substantial portion of a plurality of devices comprising a network using Public Key cryptography.

In certain embodiments, substantial portion of a plurality of devices that may join a network may be preconfigured with encryption and/or decryption key.

In certain embodiments, encryption and/or decryption keys may be loaded into a portion of a plurality of devices that may join a network using Public Key cryptography.

In certain embodiments, encryption and/or decryption keys may be loaded into substantial portion of a plurality of devices that may join a network using Public Key cryptography.

In certain embodiments, a portion of a plurality of devices may transmit one or more of the following: synchronization packet, information packet and second information packet.

In certain embodiments, number of devices from a plurality of devices transmitting one or more of the following: synchronization packet, information packet and second information packet may be at least 10%, 20%, 30%, 50%, 70%, 90%, or 100% of the plurality of devices.

In certain embodiments, synchronization packet and/or information packet may be sent as clear text and may be signed. Signing the packet may help to reduce the severity of denial of service (DoS) attacks. Signing the packet may be done by using AES-128, AES-256, AES-512 or other suitable block signing methods.

In certain embodiments, a portion of a plurality of devices transmitting synchronization or information packet may transmit the packet at one or more of the following times: randomly selected time, prescribed time, randomly selected offset within a time slot, prescribed offset within a time slot, time derived by applying a mathematical formula, and offset within a time slot derived by applying a mathematical formula.

In certain embodiments, a device may store one or more of the following: signal strength and access point ID, received information from neighboring devices, portion of received information from neighboring devices, and substantial portion of received information from neighboring devices.

In certain embodiments, a portion of a plurality of devices transmitting information packet may be at least 10%, 20%, 40%, 60%, 80%, 90%, or 100% of the devices from the plurality of devices.

In certain embodiments, a portion of a plurality of devices transmitting information packet may be between 10% to 20%, 20% to 40%, 40% to 60%, 60% to 80%, 70% to 90%, or 80% to 100% of the devices from the plurality of devices.

In certain embodiments, information packet may be encrypted.

In certain embodiments, information packet may be sent as clear text and signed.

In certain embodiments, information packet may be transmitted with higher power than data packets.

In certain embodiments, the power source may be one or more of the following: AC power, battery power, solar power, and power form energy harvesting.

In certain embodiments, device capabilities may include one or more of the following: power source, battery size, receiver current consumption, transmitter current consumption, and MPU current consumption.

In certain embodiments, device needs may include one or more of the following: device type, command size, response size, time between commands and time between responses.

In certain embodiments, a device may discard a packet if between 90% to 100%, 80% to 100%, 60% to 90%, or 50% to 80% of the information in the packet is substantially similar to information in at least one previously received packet, wherein the information in the packet may be identified as substantially similar by one or more of the following: comparing substantially entire message, comparing portion of the message, comparing message cryptographic signature, comparing portion of the message cryptographic signature and calculating hash function of the message, and comparing it to hash functions of previous messages.

Adjacent Channel

Figure 6:
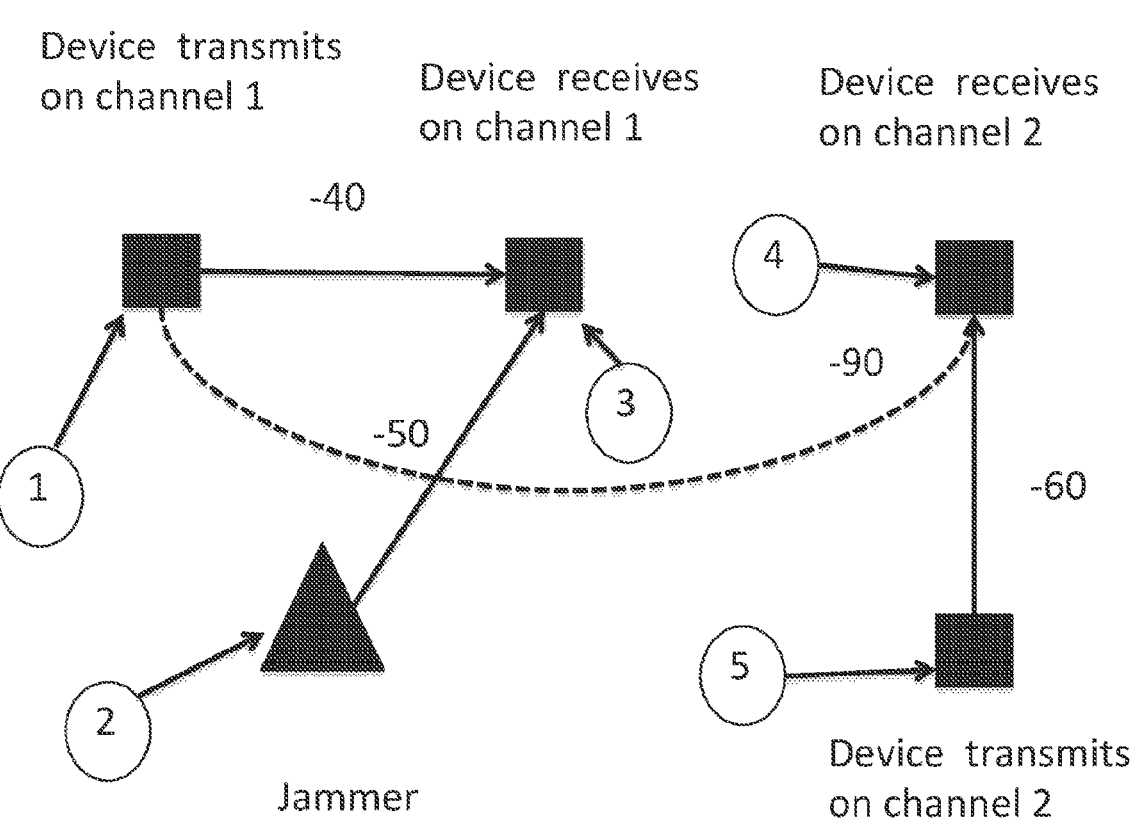
FIG. 6 depicts an exemplary embodiment of adjacent channel interference.

In certain embodiments, device may lower the RF sensitivity level. Lowering RF sensitivity level may be beneficial to substantially avoid adjacent channel interference. FIG. 6 depicts an exemplary embodiment of adjacent channel interference. In the exemplary embodiment, device 4 receives a transmission from device 5 with signal strength of −60 dBm. In the exemplary embodiment, device 4 receives a transmission from device 1 on an adjacent channel with signal strength of −90 dBm. If the transmission from device 1 is received prior, or substantially prior, to the transmission from device 5, device 4 may receive the transmission from device 1 and miss a transmission from device 5. In the exemplary embodiment, limiting device 4 sensitivity to −80 dBm may eliminate the adjacent channel jamming problem.

In certain embodiments, a synchronization preamble may be assigned to a first channel and the orthogonal preamble may be assigned to a second channel. This may be used to solve the adjacent channel problem.

Exemplary Non Limiting Applications

In certain embodiments, a portion, or substantial portion, of a plurality of devices may be acting as beacons (for example, iBeacons) to determine micro location. In certain embodiments other methods may be employed to determine macro-location and beacons may be used to determine micro-location.

In certain embodiments, access points may be LiFi access points and be interconnected through mesh network.

Devices and/or sensors that may be used with certain embodiments includes, for example, current sensors, light sensors, humidity sensors, pressure sensors, gas sensors, chemicals sensors, proximity sensors, movement sensors, magnetic (hall effect) sensors, radiation sensors, cameras, scanners, sprinkles, heater controllers, pump controllers, air-conditioning controllers, water supply controllers, or combinations thereof. In certain embodiments of the disclosed technology, a device may perform multiply functions, for example, the device may include one of more of the following: measure something, control another device (using dry contacts, wired or wireless communication protocol), monitor something, report measured data back, report anomalies, and accept and execute control commands.

Exemplary Non Limiting Asset Tracking Example

Figure 11:
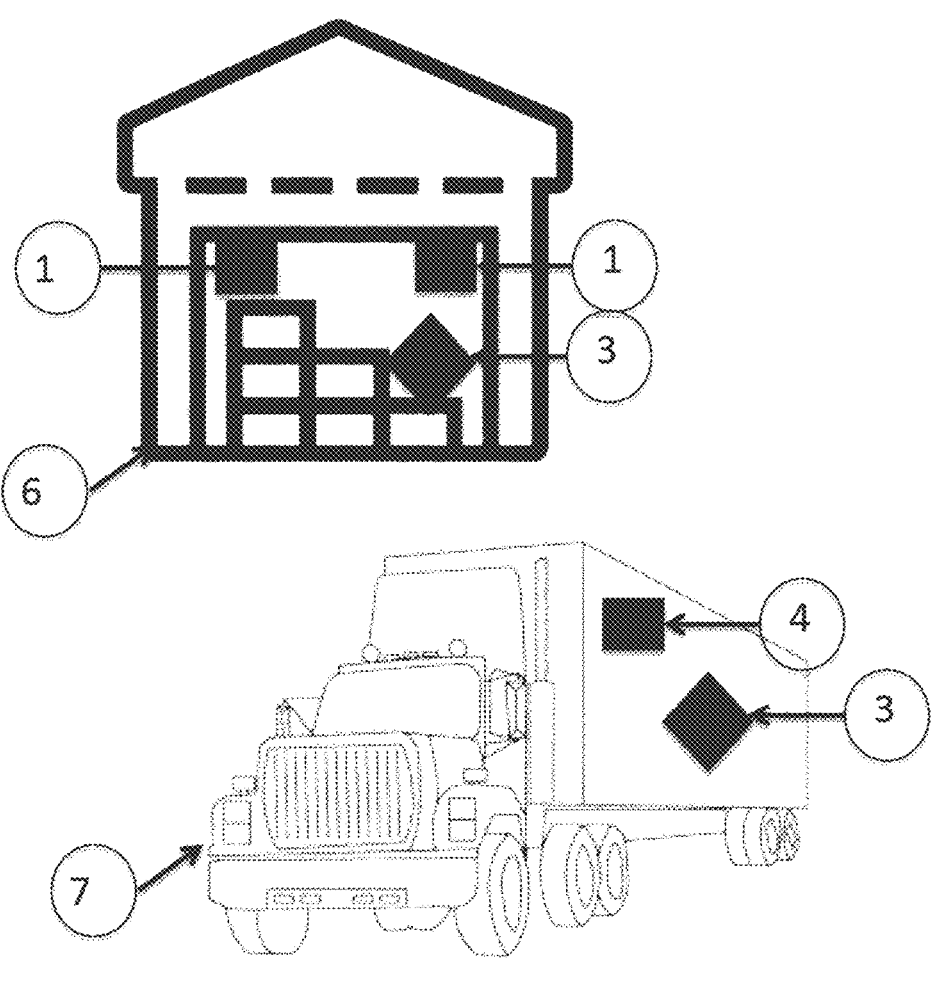
FIG. 11 illustrates an exemplary embodiment of asset tracking.
Figure 11:
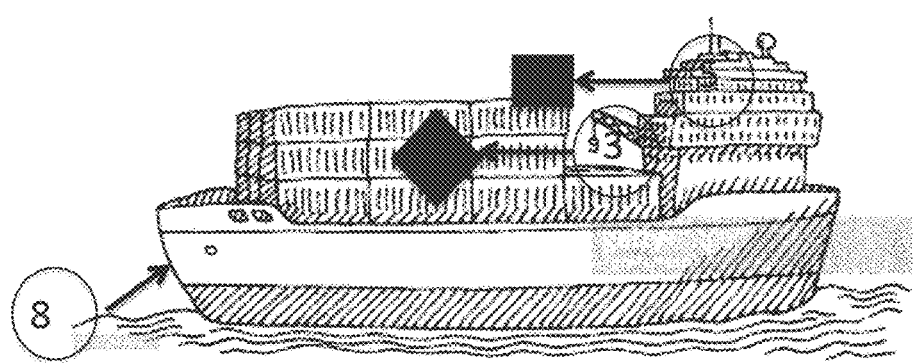

FIG. 11 illustrates an exemplary embodiment of asset tracking. In this exemplary embodiment, tag 3 is attached to an asset. access points 1 installed inside warehouse 6 and receive data from tag 3. The data received from tag 3 is used to determine at least one of the following: that the asset is inside the warehouse, micro-location of asset inside the warehouse and position of the asset relative to other assets, access points and beacons. At least one access point 4 is in vehicle 7; and the access point 4 is capable of connecting to the internet; and access point 4 is capable of receiving data from the tag 3; and the data received from tag 3 is used to determine at least one of the following: that the asset is inside the vehicle, micro-location of asset inside the vehicle and position of the asset relative to other assets, access points and beacons. At least one access point 5 is in ship 8; and the access point 5 is capable of connecting to the internet; and access point 5 is capable of receiving data from the tag 3; and the data received from tag 3 is used to determine at least one of the following: that the asset is inside the ship, micro-location of asset inside the ship and position of the asset relative to other assets, containers, access points and beacons.

In certain embodiments, a tag may also record one or more of the following parameters: temperature, acceleration, shock, vibration, humidity, light, open and close, battery level, $CO_2$, toxic gases, ice, and temperature inside a parcel and outside temperature.

In certain embodiments, at least a portion of recorded parameters may be transmitted together with data used to determine device location.

In certain embodiments, at least a portion of recorded parameters may be transmitted in addition to the data used to determine device location.

In certain embodiments, at least a portion of recorded parameters may be stored in the tag, and transmitted or retrieved later.

In certain embodiments, an asset may be considered a high value asset. For example, asset that is worth more than $10, more than $30 or more than $100. Another example is the cost of asset is at least two times the shipping cost.

In certain embodiments, an asset is tracked while being carried by a person.

In certain embodiments, the exemplarily embodiment may be used for food provenance.

Exemplary Non Limiting Location Examples

Certain embodiments described herein may be directed to way finding applications.

Certain embodiments described herein may be directed to location based push marketing Certain embodiments described herein may be directed to micro-location applications; wherein smart device determines a micro-location by receiving a data from at least one device from a plurality of devices.

Certain embodiments described herein may be directed to people tracking applications.

Certain embodiments described herein may be directed to asset management applications.

In certain embodiments, RFID reader may be embedded in the access points and/or devices and the tag may be RFID tag.

Further advantages of the claimed subject matter will become apparent from the following examples describing certain embodiments of the claimed subject matter. In certain embodiments, one or more than one (including for instance all) of the following further embodiments may comprise each of the other embodiments or parts thereof.

Examples A

A1. A system comprising a plurality of devices wherein at least one device from a first portion of devices from the plurality of devices is capable of receiving data from and sending data to at least one other device from the first portion of devices from the plurality of devices; and at least one device from a second portion of devices from the plurality of devices is capable of receiving and sending data; wherein the distance between the at least one device from the second portion of devices from the plurality of devices and the at least one device from the first portion of devices from the plurality of devices allows communication between the at least one device from the second portion of devices from the plurality of devices and the at least one device from the first portion of devices from the plurality of devices; and wherein the at least one device from the second portion of devices from the plurality of devices and the at least one device from the first portion of devices from the plurality of devices are synchronous in time; and wherein the at least one device from the second portion of devices transmits data at prescribed times; and wherein the data transmitted from the at least one device from the second portion of devices is used to determine a physical location within a space.

A2. A system of example A1, wherein the number of devices comprising the second portion of a plurality of devices is at least 100, 200, 500, 1000, 10000 and 100000.

A3. A system of one or more of the examples A1 and A2 wherein a substantial portion of a second portion of a plurality of devices are beacons.

A4. A system of one or more examples A1 to A3 wherein a substantial portion of a second portion of a plurality of devices are tags.

A5. The system of one or more examples A1 to A4, wherein devices transmit and receive data on BLE channels.

A6. The system of one or more examples A1 to A5, wherein data is transmitted as part of BLE advertisement packet.

A7. The system of one or more examples A1 to A6, wherein a substantial portion of the first portion of devices are BLE enabled access points.

A8. The system of one or more examples A1 to A7, wherein data is encrypted.

A9. The system of one or more examples A1 to A8, wherein data is signed.

A10. The system of one or more examples A1 to A9, wherein a substantial portion of a second portion of a plurality of devices are used for asset tracking.

A11. The system of one or more examples A1 to A10, wherein a substantial portion of a second portion of a plurality of devices is used for food provenance.

A12. The system of one or more examples A1 to A11, wherein a substantial portion of a second portion of a plurality of devices may be located within 500 msec, 1 second, 2 seconds, 5 seconds, 10 seconds, 20 seconds, 60 seconds and 3 minutes.

Examples B

B1. A system comprising at least one first device capable of connecting to internet and capable of wirelessly sending and receiving data; and a plurality of second devices capable of wirelessly sending and receiving data; and wherein the distance between the at least one first device and a substantial portion of the plurality of second devices allows communication between the at least one first device and a substantial portion of the plurality of second devices; and wherein the at least one first device and a substantial portion of the plurality of second devices are substantially synchronous in time; and wherein the number of devices comprising the plurality of second devices is at least 100, 200, 500, 1000, 10000 and 100000.

B2. A system comprising at least one first device capable of connecting to internet and capable of wirelessly sending and receiving data; and a plurality of second devices capable of wirelessly sending and receiving data; and wherein the distance between the at least one first device and a substantial portion of the plurality of second devices allows communication between the at least one first device and a substantial portion of the plurality of second devices; and wherein the at least one first device and a substantial portion of the plurality of second devices are substantially synchronous in time; and wherein the number of devices comprising the plurality of second devices is at least 100, 200, 500, 1000, 10000 and 100000; and wherein the at least one device from the second devices transmits data at prescribed times; and wherein the data transmitted from the at least one device from the second devices is used to determine a physical location within a space.

B3. A system of one or more examples B1 and B2, wherein a substantial portion of second devices of a plurality of devices are beacons.

B4. A system of one or more examples B1 to B3 wherein a substantial portion of second devices of a plurality of devices are tags.

B5. The system of one or more examples B1 to B4, wherein devices transmit and receive data on BLE channels.

B6. The system of one or more examples B1 to B5, wherein data is transmitted as part of BLE advertisement packet.

B7. The system of one or more examples B1 to B6, wherein at least one first device is BLE enabled access points.

B8. The system of one or more examples B1 to B7, wherein data is encrypted.

B9. The system of one or more examples B1 to B8, wherein data is signed.

B10. The system of one or more examples B1 to B9, wherein a substantial portion of a second devices are used for asset tracking.

B11. The system of one or more examples B1 to B10, wherein a substantial portion of a second devices is used for food provenance.

B12. The system of one or more examples B1 to B11, wherein a substantial portion of a second devices may be located within 500 msec, 1 second, 2 seconds, 5 seconds, 10 seconds, 20 seconds, 60 seconds and 3 minutes.

Examples C

C1. A method of determining device location, wherein a location of at least one device from a first plurality of devices is known; and wherein the at least one device from the first plurality of devices and at least one first device from a second plurality of devices and at least one second device from the second plurality of devices are synchronous in time; and wherein the at least one second device from the second plurality of devices sends a first packet containing a payload and the at least one first device from the second plurality of devices receives the first packet containing the payload; and wherein the at least one first device from the second plurality of devices sends a second packet containing at least a portion of the payload contained in the first packet and the RSSI of the first packet; and wherein the payload of the second packet is used to determine the location of the at least one first device from the second plurality of devices and/or the at least one second device from the second plurality of devices.

C2. A method of example C1, wherein a second plurality of devices is at least 100, 500, 1000, 10000 and 100000.

C3. A method of one or more examples C1 and C2, wherein a substantial portion of second plurality of devices are beacons.

C4. A method of one or more examples C1 to C3 wherein a substantial portion of second plurality of devices are tags.

C5. A method of one or more examples C1 to C4, wherein devices transmit and receive data on BLE channels.

C6. A method of one or more examples C1 to C5, wherein data is transmitted as part of BLE advertisement packet.

C7. A method of one or more examples C1 to C6, wherein at least one first device is BLE enabled access points.

C8. A method of one or more examples C1 to C7, wherein data is encrypted.

C9. A method of one or more examples C1 to C8, wherein data is signed.

C10. A method of one or more examples C1 to B9, wherein a substantial portion of a second devices are used for asset tracking.

C11. A method of one or more examples B1 to B10, wherein a substantial portion of a second devices is used for food provenance.

C12. A method of one or more examples B1 to B11, wherein a substantial portion of a second devices may be located within 500 msec, 1 second, 2 seconds, 5 seconds, 10 seconds, 20 seconds, 60 seconds and 3 minutes.

It will be understood that the embodiments disclosed and defined in this specification extends to all alternative combinations of two or more of the individual features mentioned or evident from the text or drawings. All of these different combinations constitute various alternative aspects of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:
1. A system comprising:
a plurality of devices wherein at least one device from a first portion of devices from the plurality of devices is capable of receiving data from and sending data to at least one other device from the first portion of devices; and
at least one device from a second portion of devices from the plurality of devices is capable of receiving and sending data;
wherein the distance between the at least one device from the second portion of devices and the at least one device from the first portion of devices allows RF communication between the at least one device from the second portion of devices and the at least one device from the first portion of devices; and wherein the at least one device from the second portion of devices receives a first synchronization packet from the at least one device from the first portion of devices and a second synchronization packet from the at least one other device from the first portion of devices, wherein the first and second synchronization packets are transmitted on different RF channels, and wherein the at least one device from the second portion of devices uses the first and second synchronization packets to adjust a clock to synchronize with the at least one device from the first portion of devices.

2. The system of claim 1 wherein a substantial portion of the second portion of devices are beacons.

3. The system of claim 1, wherein a substantial portion of the second portion of a plurality of devices are tags.

4. The system of claim 1, wherein from the first portion devices and/or the second portion devices transmit and/or receive data on BLE channels.

5. The system of claim 1, wherein data is transmitted as part of BLE advertisement packet.

6. The system of claim 1, wherein a substantial portion of the first portion of devices are BLE enabled access points.

7. The system of claim 1, wherein data is encrypted.

8. The system of claim 1, wherein data is signed.

9. The system of claim 1, wherein the at least one device from the second portion of devices uses the first and second synchronization packets to adjust the clock to synchronize with the at least one other device from the first portion of devices.

10. The system of claim 1, wherein the first and second synchronization packets are orthogonal to each other.

11. The system of claim 1, wherein at least one of the first and second synchronization packets is combined with an information packet, a location packet, or a combination thereof.

12. The system of claim 11, wherein the at least one synchronization packet combined with the information packet is configured to be discarded by the at least one device from the second portion of devices if between 90% to 100%, 80% to 100%, 60% to 90%, or 50% to 80% of information in the information packet is substantially similar to information in at least one previously received packet.

13. The system of claim 1, wherein the first synchronization packet received by the at least one device from the second portion of devices has an RSSI higher or equal to the rest of the devices of the first portion of devices.

14. The system of claim 1, wherein a location of the at least one device from the first portion of devices is known.

15. The system of claim 14, wherein a location of the at least one other device from the first portion of devices is known.

16. The system of claim 1, wherein at least one of the at least one device from the first portion of devices and the at least one other device from the first portion of devices is fixed.

17. The system of claim 1, wherein at least one of the first and second synchronization packets contains a time slot associated with an access point, a hash value of a time slot table associated with an access point, or a combination thereof.

18. The system of claim 17, wherein the hash value of the time slot table associated with the access point is used by the at least one device from the second portion of devices to determine whether to listen for an information packet.

19. The system of claim 1, wherein the RF channels are one or more of the following: narrow band RF channel, wideband RF channel, and ultra-wide band RF channel.

20. The system of claim 15, wherein the at least one device from the second portion of devices receives a first location packet from the at least one device from the first portion of devices and a second location packet from the at least one other device from the first portion of devices.

* * * * *